L. KUNTZLER.
SAFETY WAY AND STOP SIGNAL FOR AUTOMOBILES AND OTHER VEHICLES.
APPLICATION FILED JUNE 25, 1920.

1,356,295.                                           Patented Oct. 19, 1920.

INVENTOR:
Louis Kuntzler,
BY John Elias Jones,
ATTORNEY.

UNITED STATES PATENT OFFICE.

LOUIS KUNTZLER, OF COVINGTON, KENTUCKY.

SAFETY WAY AND STOP SIGNAL FOR AUTOMOBILES AND OTHER VEHICLES.

1,356,295.

Specification of Letters Patent. Patented Oct. 19, 1920.

Application filed June 25, 1920. Serial No. 391,755.

*To all whom it may concern:*

Be it known that I, LOUIS KUNTZLER, a citizen of the United States of America, and a resident of Covington, in the county of Kenton and State of Kentucky, have invented a certain new and useful Improvement in Safety Way and Stop Signals for Automobiles and Other Vehicles, of which the following is a specification.

This invention relates to safety way and stop signals for automobiles and other vehicles, but mainly for automobiles, and its object is to provide signal-lamps at both ends of the dash adjacent the opposite ends of the wind-shield, at the fore end of the vehicle, such lamps having colored and clear sides to them, as well as words or symbols to indicate the direction of advance or backward movement of the vehicle and the halting or stopping thereof, and suitable mechanical means being afforded in convenient position on the driver's dash-board, beneath the wind-shield, to partially rotate the said signal-lamps, independent of each other, into the desired signaling-sight of those approaching from both the front and rear of the vehicle.

The details of structure, including the make-up of the lamp illuminator-openings and the peculiar mechanism on the dash for rotating the lamps into the desired signaling positions, will be fully described hereinafter in connection with the accompanying sheet of drawings, in which latter—

Figure 1:
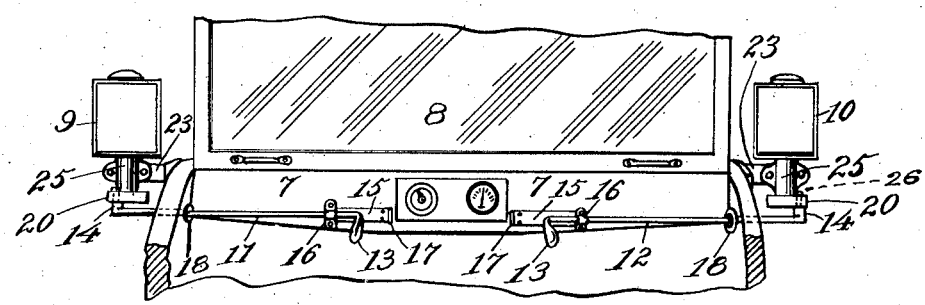
Figure 2:
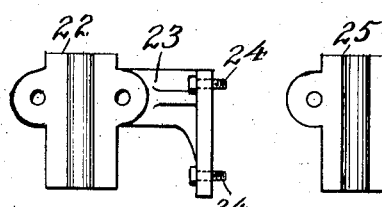
Figure 3:
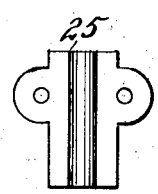
Figure 4:
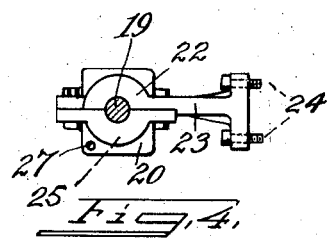
Figure 5:
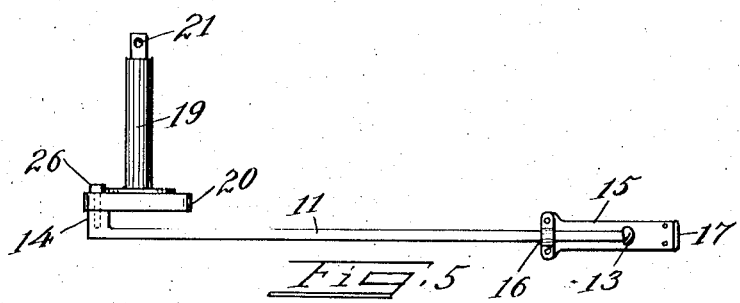
Figure 6:
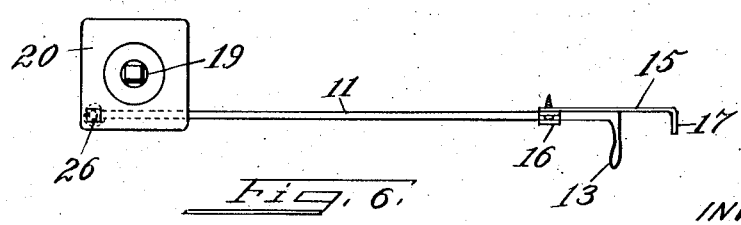

Figure 1 is an elevation of a fragmentary portion of the fore end of an automobile (in the driver's box) showing the dash, the wind-shield, the signal-lamps at opposite ends of the dash, and the shifting-mechanism on the inner face of the dash for operating the lamps, independent of each other, into their respective signaling or reading positions; Fig. 2, a detail elevation of one of the lamp-brackets, with its journal-box cap-plate removed; Fig. 3, a detail elevation showing the inner face of the said journal-box cap-plate; Fig. 4, a plan view showing one of the lamp-brackets complete, with the lamp pivot or journal shown in horizontal cross-section; Fig. 5, an elevation of the signal operating or shifting mechanism shown to the left-hand in Fig. 1, but with the lamp itself omitted from its place on the upright pin or supporting-spindle that is provided on the crank plate or disk at the outer end of the actuating shifter rod or hand-lever; and Fig. 6, a plan view of the device shown in Fig. 5. (In these views the two signal-lamps are shown in neutral or normal position, for straight-ahead movement of the vehicle.)

7 indicates the dash and 8 the wind-shield, both as customary in automobile structures as at present made, with the wind-shield surmounting the dash.

9 indicates the left-hand signal-lamp and 10 the right-hand signal-lamp, (looking forwardly from the driver's seat).

These signal-lamps have their four vertical sides of open frame-work that is filled or inclosed with glass or the like, such glass-filling, for example, being colored green in two opposite openings of the left-hand lamp 9 and the glass-filling colored red in two opposite openings of the right-hand lamp 10, and the other two opposite panels or openings in both the left and right lamps being filled or inclosed with clear glass and with the signal-word "Stop" or "Back" duly painted or otherwise produced thereon. The green fillings are each preferably provided with the signal-word "Left," showing front and rear simultaneously, and the red fillings or panels are each provided with the signal-word "Right," showing likewise front and rear simultaneously when the lamps are adjusted into their respective "Left" and "Right" indicating positions, to be viewed or seen from both front and rear, for both day and night use, but more especially night use.

As the lamps are mounted so as to be actuated or rotated independent of each other, the clear panels or fillings in the lamp to the left-hand may contain the signal-word "Back" and those in the lamp to the right-hand may contain the signal-word "Stop" to be viewed both from the front and rear simultaneously, or they can both have the word "Stop," which is the most used of the two and seen from the rear only, leaving the glass panel clear to the front view, to provide more generally against a rear-end collision.

To actuate or rotate the two signal-lamps 9 and 10, I provide on the inner face of the dash 7 a pair of horizontally-slidable shifter rods or hand-levers 11 and 12, respectively, that are of corresponding structure and have handles 13 at their inner ends to conveniently manipulate them endwise. At the outer ends of the rods or levers 11 and 12 I produce an upturned head or projection 14 that is vertically tapped, and a guide-plate 15 is mounted on the dash 7 for each of the said shifter-rods to slide in, outwardly-extending fastening-plates or eyes 16 being provided on said guide-plates 15 at their outer ends, and outwardly-extending stops 17 being formed at their extreme inner ends. The outer ends of the shifter-rods extend through and are duly guided in openings 18 made in the vehicle body at the opposite ends of the dash, as best seen in Fig. 1.

The fastening-plates or eyes 16 and the stops 17 are designed to limit the stroke in both directions of the independent shifter-rods 11 and 12 for the desired position of the signal devices in operating a vehicle.

The signal-lamps are each provided in their bottoms with square or rectangular center holes (not shown) that are adapted to be mounted on the square upper ends of the spindles 19, the latter, in turn, being mounted on the square crank plates or disks 20, and the said square upper ends of the spindles having holes 21 pierced therein for the insertion of cotter-pins or the like (not shown) to hold the lamps in place on the spindles as well as to support the crank-disks 20 with their spindles 19 in rotatable engagement with the journal-boxes 22 that form integral parts of the brackets 23, the latter, in turn, being secured in place by means of screws 24 on the body of the vehicle at the opposite ends of the dash and at a convenient elevation or height above the roadway for a clear view to both front and rear of the vehicle, which is on a higher level than that of the ordinary front and rear lamps, so as not to become confused with the latter and affords a more distinct and very much better view thereof to approaching vehicles from both the front and rear.

A removable cap-plate 25 (best seen in Fig. 3) is used on the several journal-boxes 22 for the ready insertion of the spindles 19 into place.

The upturned outer ends 14 of the shifter-rods are detachably connected to the crank-disks 20 by means of square-headed screw-bolts 26 (best seen in Figs. 5 and 6) whose threaded shanks pass downwardly through corner-holes 27 made in the said crank-disks and thence into the threaded openings made in the said upturned outer ends 14.

I claim:—

In a safety way and stop signal device for automobiles and other vehicles, a rotatable signal-lamp adapted to be independently mounted at the fore end of the vehicle at opposite ends of the wind-shield and having color and indicator panels therein, a supporting-bracket provided for each lamp and having a vertical journal-box at its outer end, a plate or disk provided for each lamp and having a central upright spindle adapted to rotate in said vertical journal-box, a transverse shifter-rod extending eccentrically from the said plate or disk of each lamp-spindle along the inner face of the dash to near the center thereof and having a manipulating-handle at its inner end for independent operation of the desired signal-lamp, guide-ways on the said inner face of the dash for said shifter-rods, and stroke-limiting stops on the said inner face of the dash for the said independently-operating shifter-rods, substantially as herein shown and described.

LOUIS KUNTZLER.